A. B. GRAHAM.
Harvester.
No. 76,436. Patented April 7, 1868.
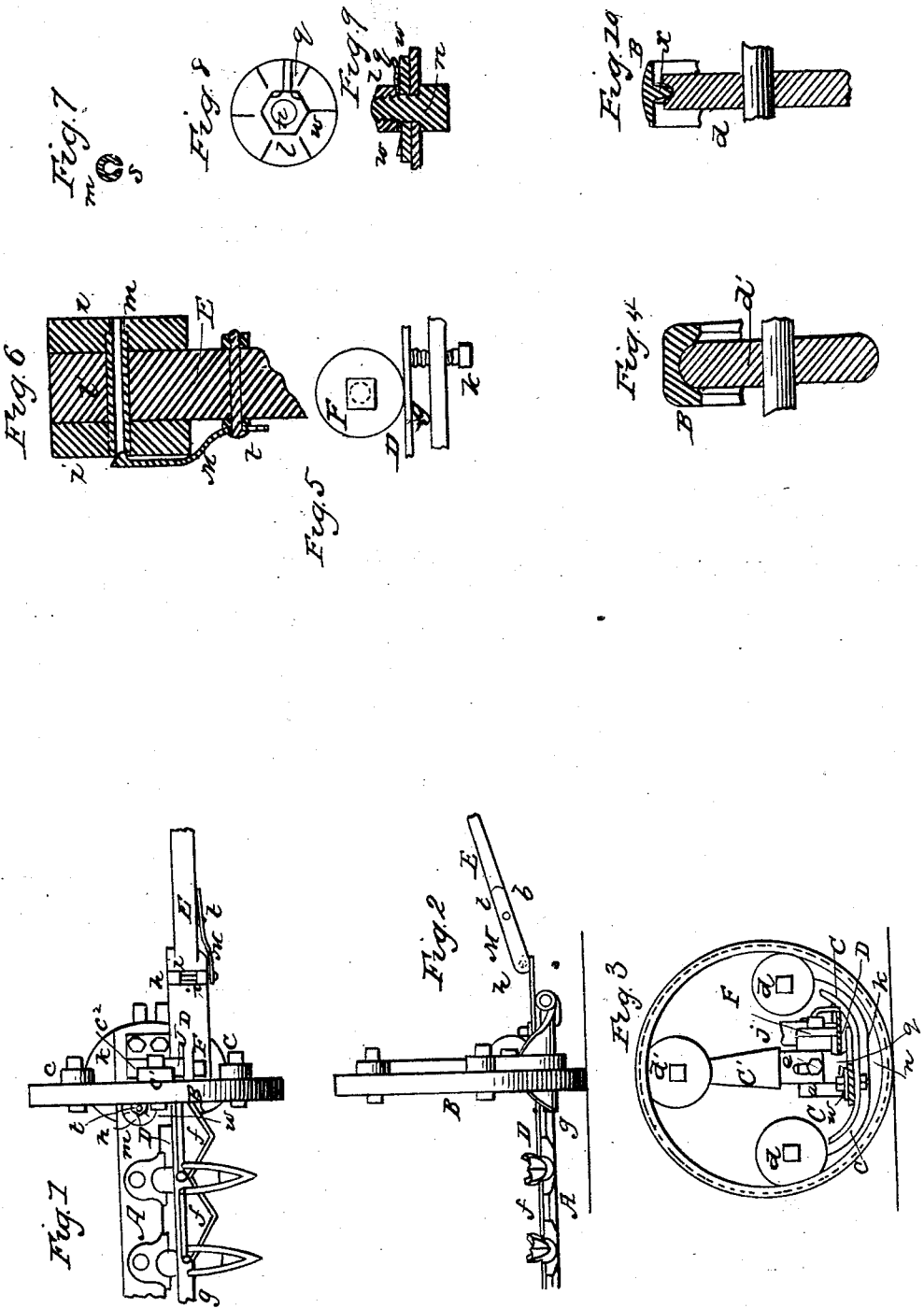
Witnesses
W. L. Bennem
Chas. H. Leonard
Inventor
A. B. Graham
by his attorney
E. F. Fenwick

United States Patent Office.

ALVARO B. GRAHAM, OF WAUKEGAN, ILLINOIS.

Letters Patent No. 76,436, dated April 7, 1868

IMPROVEMENT IN HARVESTERS.

The Schedule referred to in these Letters Patent and making part of the same.

TO ALL WHOM IT MAY CONCERN:

Be it known that I, ALVARO B. GRAHAM, of Waukegan, in the county of Lake, and State of Illinois, have invented certain new and useful Improvements in Harvesters, some of which are applicable also to other purposes; and that the following is a full, clear, and exact description and specification of my said invention.

The object of the first part of my invention is to support the ends of the finger-beam of a harvester. Shoes running upon the ground have heretofore been used for this purpose, but their use is attended with much friction, and as this friction is exerted at one side only of the machine, the side-draught is increased thereby. In order to obviate this friction, and at the same time to furnish an efficient support, I have combined the finger-beam with what I designate a revolving shoe, which consists of an annular wheel, encircling and supporting the finger-beam, which is hung in the revolving shoe upon friction-wheels. As the revolving shoe and friction-wheels may be of large diameter, the friction is greatly less than that caused by the sliding of a shoe upon the ground, or that caused by the sliding of a portion of the beam within a revolving shoe, which turns upon said beam as an axle. The revolving shoe may be applied to one or both ends of the finger-beam, as deemed expedient.

The object of the next part of my invention is to enable the revolving shoe to be readily applied and removed, and also to enable the friction-wheels to be kept in their proper positions notwithstanding the wear at their arbors. This part of my invention consists of the combination of the finger-beam and revolving shoe with a sliding arm sustaining the arbor of one of the friction-wheels or other bearing that holds the revolving shoe in place, so that such friction-wheel or bearing may be adjusted in position as required.

The object of the next part of my invention is to reduce the friction and tendency to bind at the joint between the cutter and the pitman or connecting-rod that imparts motion to it, and consists of the combination of the two members of the hinge-joint by means of a split tubular-joint pin, so that when binding tends to take place, the joint-pin relieves itself by contracting in diameter.

The object of the next part of my invention is to hold the joint-pin of the hinge-joint between the connecting-rod or pitman and the cutter, in place, and at the same time to permit its ready removal. This part of my invention consists of the combination of the joint-pin of the hinge-joint with a spring-holder, having a teat which engages in a socket at one of the ends of the joint-pin; and the joint-pin, which forms part of this combination, may be either a split tubular-joint pin, as previously specified, or a solid pin with a socket at one end, or a tubular pin, as deemed expedient, the split tubular-joint pin being, in my opinion, preferable to the others. If a solid joint-pin be used, the teat may be formed upon it, and a cavity be formed in the spring-holder to engage with said teat.

The object of the next part of my invention is to hold the screw-bolt nuts and bolts of the machine from working loose by jars, and it consists of the combination of the bolt-nut or bolt-head with a spring-latch and with ratchet-teeth, which, in connection with the latch, permit the nut or bolt to be turned in one direction, but resist its turning in the opposite direction until the spring-latch is disengaged from the ratchet-teeth. The spring-latch, forming part of this combination, is connected by preference with the nut or with the bolt-head, and the ratchet-teeth with the article through which the screw-bolt is passed; but the position of the spring-latch and ratchet-teeth may be reversed. The ratchet-teeth also may be constructed directly upon the face of the article through which the bolt passes, or upon a washer applied to the article, and in the latter case there should be teeth or some similar fastening to prevent the washer from turning.

All of my aforesaid improvements are contained in the portion of the harvester represented in the accompanying drawings, in which—

Figure 1 represents a plan of parts of the machine.

Figure 2 represents a front view of the same.

Figure 3 represents a transverse section of the same; and

Figures 4 to 10 represent views of parts of the machine detached from the remainder, and designated by the same letters of reference as the corresponding parts in the first three figures.

The finger-beam, A, of said harvester is sustained by the revolving shoe B, which, as represented, is an annular wheel encircling the finger-beam. The finger-beam is provided with arms, $c\ c\ c^1$, whose ends have friction-wheels, $d\ d\ d'$, applied to them; and the treads of these wheels run against the inner side of the annular wheel, so that the finger-beam is hung in said revolving shoe by means of the friction-wheels. One of the arms, $c^1$, of said friction-wheels is fitted to slide in a box, $c^2$, secured to the finger-beam, and the part of the arm within the said box is slotted so as to permit the arm to be moved longitudinally upon a clamp-screw, $e$, that screws it in its position in the box $c^2$; hence the arm may be readily moved to permit the revolving shoe to be applied and removed, and to permit the friction-wheel, carried by the sliding arm, to be reset to take up excessive play produced by the wear at the arbors of the friction-wheels.

The cutter or sickle, D, of the harvester, may be of the ordinary construction, that is to say, composed of blades, $f$, secured to a stock, $g$. This cutter is constructed to be operated by a reciprocating pitman or connecting-rod, E, which connects at one end with the cutter by a hinge-joint, $h$, and at the other with the crank-pin of the cutter-shaft. It is customary in harvesters to arrange the cutter-shaft above the level of the line of motion of the cutter; hence the mean line of the connecting-rod E inclines upwards from the cutter; consequently, when the connecting-rod is making the inward stroke, or, in other words, is pulling the cutter, there is an upward drag of the cutter against the bearing which keeps it from rising. In order to reduce the friction due to such upward drag, a friction-wheel, F, is applied over the heel of the cutter, and is sustained in that position by a bracket, $j$, which connects its arbor with the heel of the finger-beam; hence the upward strain of the cutter brings it in contact with this friction-wheel, F, which, turning on its arbor, materially reduces the friction. In order to take up any excessive play between the cutter and the friction-wheel during the outward or pushing stroke, (when the cutter is pushed downward by the connecting-rod,) a bearing-screw, $k$, may be applied beneath the cutter, or the same effect may be accomplished by making the bracket of the friction-wheel adjustable upon the finger-beam.

The two members, $i\ i'$, of the joint between the heel of the cutter D and the adjacent end of the connecting-rod E, are combined by a joint-pin, $m$, which has the form of a pipe or tube split longitudinally at one side, as at $s$, fig. 7. The effect of this split is to permit the joint-pin to contract in diameter when binding occurs, and thus relieve itself. Such a pin is most readily formed by bending a flat piece of steel, of the requisite width and length, around a mandrel, and then turning off its exterior. In order to hold the joint-pin in its place, and permit it to be readily removed and replaced, it is combined with the spring-holder M, which is a narrow steel plate, and is fitted at one end with a small teat, $r$, fig. 6, that can engage in the socket or cavity in the end of the joint-pin. The holder is constructed to turn edgewise upon a bolt or pivot, $t$; hence, by springing the teat out of the cavity in which it is engaged, the holder may be readily turned out of the way of the joint-pin, so that it may be readily applied or removed.

The last part of my invention is represented in the drawing as applied to the nut of the screw-bolt, $n$, that secures the heel of the finger-beam to the saddle K, which connects the arms $c\ c$ of two of the friction-wheels $d\ d$. The nut $l$ of this bolt has a slight cavity in its under side to receive the stock of the spring-latch $q$, which protrudes radially from the nut over the ring of ratchet-teeth, $w$, which, in this example, are formed upon a washer that is prevented from turning upon the saddle K by means of small pins passing from one to the other. While the nut is being screwed down, the spring-latch readily rises along the inclined sides of the ratchet-teeth, and passes over them; but when the nut is screwed down, any tendency to turn backwards is stopped by the engagement of the spring-latch with the square side of the adjacent ratchet-tooth, so that the nut cannot work loose, and can be unscrewed (without breakage) only by raising the spring-latch by an instrument, so that it may pass over the ratchet-teeth. The dimensions of drawings for patents being limited, I have not deemed it expedient to represent the application of this part of my invention to the nut of more than one screw-bolt, but I apply it to every screw-nut in the machine that is liable to work loose by jar; and when the article to be secured is cast iron, I form the ratchet-teeth directly upon its face in the process of casting.

Having thus described machinery embodying my improvements, I declare that I do not limit them to the precise forms represented and described, as these may be varied without evading my invention. Thus, for example, the revolving shoe, instead of being concave within, may have upon its interior a convex ridge, as at $x$, fig. 10, which engages in grooves formed in the rims of the friction-wheels. The friction-wheels may be arranged at the outer side of the revolving shoe instead of within it, and four or more may be used; but as such exterior arrangement occupies much more room, and as earth taken up by the rim of the shoe would pass between it and the friction-wheels, I do not prefer it. The split tubular-joint pin may be applied not only to combine the members of the hinge-joint of the cutter and connecting-rod, but to other hinge-joints wherever this combination may be useful. So also the spring-holder may be combined with every joint-pin that it is desirable should be capable of ready application and removal. When screw-bolts are screwed directly into the articles they secure, the spring-latch may be combined directly with the bolt-head, which would then be the substitute in the combination for the nut, and this part of my invention is applicable to all cases where nuts or bolts are liable to become unscrewed by jar or tremor.

What I claim as my invention, and desire to secure by Letters Patent, is—

The combination of the finger-beam of a harvester with a revolving shoe, through the intervention of friction-wheels, substantially as before set forth.

Also, the combination of the finger-beam, revolving shoe, and sliding arm of the bearing that holds the revolving shoe in place, substantially as before set forth.

Also, the combination of the members of a hinge-joint with a split tubular-joint pin, substantially as before set forth.

Also, the combination of the joint-pin of a hinge-joint with a spring-holder and teat, substantially as before set forth.

Also, the combination of the bolt-head or nut with the spring-latch and ratchet-teeth, substantially as before set forth.

In testimony whereof, I have hereto set my hand, this 22d day of May, A. D. 1867.

A. B. GRAHAM.

Witnesses:
    JOHN E. CLARKSON,
    GEO. FERGUSON.